United States Patent
Hoving et al.

(10) Patent No.: US 8,021,002 B2
(45) Date of Patent: Sep. 20, 2011

(54) SPECKLE-GENERATING LIGHTING SYSTEM FOR ATTRACTING VIEWER'S ATTENTION

(75) Inventors: Willem Hoving, Eindhoven (NL); Christoph Dobrusskin, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 355 days.

(21) Appl. No.: 12/304,129

(22) PCT Filed: Jun. 11, 2007

(86) PCT No.: PCT/IB2007/052198
§ 371 (c)(1), (2), (4) Date: Dec. 10, 2008

(87) PCT Pub. No.: WO2007/144816
PCT Pub. Date: Dec. 21, 2007

(65) Prior Publication Data
US 2009/0268449 A1 Oct. 29, 2009

(30) Foreign Application Priority Data
Jun. 12, 2006 (EP) .................... 06115261

(51) Int. Cl.
*F21V 33/00* (2006.01)
*H01S 3/10* (2006.01)

(52) U.S. Cl. .......... 353/94; 362/553; 362/234; 372/9
(58) Field of Classification Search .......... 353/85, 353/31, 38, 121, 122, 33, 34, 37, 94; 349/5, 349/7, 8, 9; 362/553, 555, 561, 227, 234
See application file for complete search history.

(56) References Cited

U.S. PATENT DOCUMENTS

| | | | |
|---|---|---|---|
| 3,724,933 A * | 4/1973 | Mohon et al. | 351/243 |
| 7,292,393 B2 * | 11/2007 | Kvamme | 359/566 |
| 7,370,973 B2 * | 5/2008 | Sakaguchi et al. | 353/20 |
| 7,585,078 B2 * | 9/2009 | Kim et al. | 353/82 |
| 2003/0062414 A1 * | 4/2003 | Tsikos et al. | 235/454 |
| 2005/0007550 A1 * | 1/2005 | Turkov et al. | 351/203 |
| 2010/0053565 A1 * | 3/2010 | Mizushima et al. | 353/38 |
| 2010/0141898 A1 * | 6/2010 | Moussa | 353/38 |
| 2010/0296065 A1 * | 11/2010 | Silverstein et al. | 353/38 |

* cited by examiner

*Primary Examiner* — William C Dowling

(57) ABSTRACT

The present invention relates to a lighting system (1), having a laser (3), and a method carried out in such a system. The system is arranged to vary the coherence of outputted light, preferably periodically, such that the light, when projected onto a surface (7; 33), produces a varying amount of speckle. This has proven useful as a tool to attract the attention of a user viewing the light projected on the surface.

14 Claims, 2 Drawing Sheets

SPECKLE-GENERATING LIGHTING SYSTEM FOR ATTRACTING VIEWER'S ATTENTION

FIELD OF THE INVENTION

The present invention relates to a lighting system, for producing visible outputted light, the system comprising at least one laser. The invention further relates to a method used in connection with such a system.

BACKGROUND OF THE INVENTION

A lighting system of the above mentioned type is disclosed e.g. in WO 2004/102258.

A general problem with lighting systems of various kinds is to find ways, under certain circumstances, to attract the attention of a user, who today often receives great amounts of visual information already.

For instance in a traffic environment it may be necessary to make sure that a vehicle driver's attention is attracted to a warning sign. Similarly in a laser display system, it may be desired to make sure that a user is made aware of a changed content in a displayed image.

SUMMARY OF THE INVENTION

An object of the present invention is therefore to provide a lighting system with improved means for attracting a user's attention.

This object is achieved by means of a lighting system according to claim 1. More specifically, a lighting system, for producing visible outputted light, is achieved. The system comprises at least one laser, and the system is arranged to vary the coherence of the outputted light, such that the light, when projected onto a surface, produces a varying amount of speckle thereby attracting the attention of a viewer.

By coherence is here meant the temporal or spatial coherence of the light beam, or both.

The inventors have found that the occurrence of a "flashing" speckle pattern is a very powerful tool for attracting the attention of a user. Flashing does here not necessarily mean that the brightness of the light is varied, just the amount of produced speckle.

The coherence of the outputted light may be varied periodically. This increases the desired effect.

It is possible to achieve the desired effect with a laser comprising built-in controllable coherence reduction means. Such a laser may comprise a VCSEL array comprising a plurality of light emitting sub-elements. By activating sub-elements with different mutual distances the coherence of the outputted light may be varied. This provides a design with low complexity, where moveable parts are not needed.

Alternatively, the laser may produce a continuous high-coherence laser beam and the system may then further comprise a controllable coherence reducer, through which the laser beam propagates and which to a controllable extent removes the coherence of the propagating laser beam.

As another alternative, the system may comprise a first and a second laser, wherein, in a high-coherence mode, the first laser continuously produces the outputted light, and, in a low-coherence mode the first and second lasers are arranged to be switched on and off in order to alternatingly produce the outputted light, wherein the lighting system is switched between high- and low-coherence modes.

As yet another alternative, the system may further comprise a non-laser light source, wherein, in a high-coherence mode, the at least one laser produces the outputted light, and, in a low-coherence mode the non-laser light source produces the outputted light, wherein the lighting system is switched between high- and low-coherence modes.

The lighting system may be arranged as a lamp having a transparent screen or as a display device, generating an image on a display surface. In the latter case, the system may be arranged in such a way that speckle pattern is generated on a limited area of the display surface.

A method in a lighting system for producing outputted visible light is also considered. The system comprises at least one laser, and the coherence of the outputted light is varied, such that the light, when projected onto a surface, produces a varying amount of speckle thereby attracting the attention of a viewer.

These and other aspects of the invention will be apparent from and elucidated with reference to the embodiments described hereinafter.

DESCRIPTION OF PREFERRED EMBODIMENTS

Speckle patterns occur when a highly coherent laser beam is scattered by a rough surface such as a paper or a fabric. Different parts of the beam add up to intensity peaks and valleys, which result in a mottled pattern which may be experienced as unpleasant to watch.

Therefore a number of techniques have been developed to reduce speckle in a laser beam. In general, such techniques reduce the temporal and/or spatial correlation of the laser beam. A simple example may be a moveable, e.g. rotating, diffuser placed in the laser beam path as disclosed e.g. in U.S. Pat. No. 6,154,259, B1. This diffuser reduces the coherence of the laser beam and thus the occurrence of speckle artifacts.

It has however been found by the inventors of the present invention that speckle patterns may also be useful in some circumstances in lighting and display systems. Since the speckle patterns may be experienced as unpleasant to watch, they may also be used as a powerful tool to attract the attention of a user, e.g. to make the user aware of new information displayed in a display system or a warning signal provided by a laser driven lamp.

Thus, the present invention, whether expressed as method or a device, involves varying coherence of light outputted by a lighting system in order to make a varying speckle pattern appear, thus attracting the attention of a user. By varying the amount of speckle the amount of speckle is both reduced and increased.

This general inventive idea may be realized in different applications and using different means as will be described further in the following.

Figure 1:
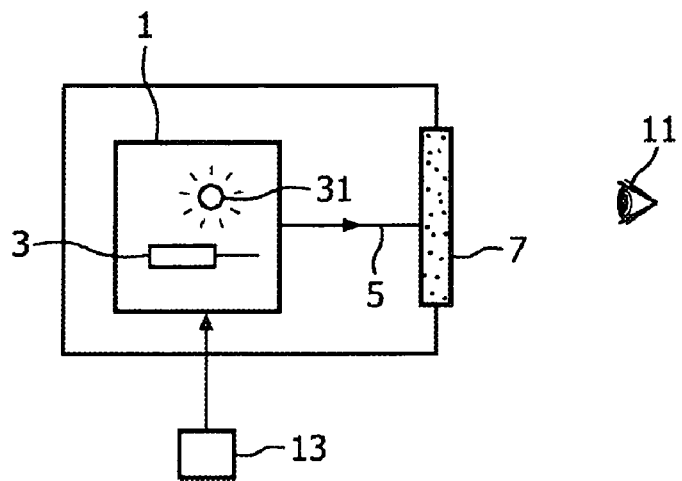
FIG. 1 illustrates a lighting system.

FIG. 1 illustrates schematically a lighting system 1. The system comprises a laser light source 3, which may be e.g. a frequency-converted solid state laser, a laser diode or a gas laser. The lighting system 1 produces a light beam 5, that is propagated to a screen surface 7. The light may pass through a beam expander (not shown) that distributes the light evenly over the screen surface 7. This system is thus devised as a lamp. The screen may be transparent so that the light can be seen at the position of the user indicated at 11.

The screen surface scatters the light and has such surface properties that, if the beam 5 is reasonably coherent, a speckle pattern appears on the screen and may be viewed by the user 11. The lighting system further comprises means 13 for controlling the lighting system 1 in such a way that the coherence of the light beam 5 and thus the amount of speckle may be varied.

By varying the amount of speckle, e.g. periodically, the user's attention is attracted to the lighting device in a very powerful way. This effect may be utilized in various lighting applications. One possible application is road signs of different kinds, for instance warning signs. The use of a varying speckle pattern in such a sign will make the warning a lot more efficient. One important aspect is further that the amount of speckle experienced when watching such a sign in fact increases with the distance to the viewer, which is considered interesting in traffic environments. Of course, many other applications of such a laser lighting system may be considered.

The speckle pattern may be switched on and off, or the amount of speckle may be varied more continuously. It is possible to let the speckle pattern appear in a flashing manner, where the speckle is turned on and off, e.g. at a switching frequency of a few Hz.

Figure 2:
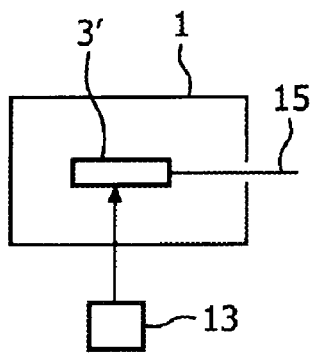
FIG. 2 illustrates schematically a laser with controllable coherence.

FIG. 2 illustrates schematically a lighting system with a laser 3' having controllable coherence. In this case the laser itself is controllable, such that the coherence of the outputted beam 15 may be varied when the control means 13 apply different control signals. The outputted beam 15 from the laser 3' here constitutes the light outputted by the lighting system 1.

The laser 3' may then for instance consist of a VCSEL (Vertical Cavity Surface Emitting Laser) array comprising a plurality of sub-elements which may be individually controlled. The coherence of the outputted light depends on the distance between the used sub-elements. Therefore, by activating elements grouped together in the array, a high coherence beam may be outputted. On the other hand, by activating elements spread out in the array, a beam with lower coherence may be obtained.

Figure 3:
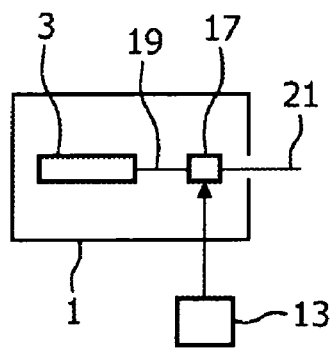
FIG. 3 illustrates schematically a laser which is optically connected to means for reducing the coherence of the laser beam.

FIG. 3 illustrates schematically a laser 3 which is optically connected to means 17 for reducing the coherence of the laser beam. Thus, the laser outputs a primary beam 19 that has high coherence. The primary beam propagates through a controllable coherence reducer 17, which, to a controllable extent, reduces the coherence of the beam to produce a secondary beam 21. The secondary beam 21 here constitutes the light outputted by the lighting system 1. The control means 13 controls the coherence reducer 17. The controllable coherence reducer 17 may comprise a microlens array as disclosed e.g. in US2005/0248849. By moving the microlens array, e.g. by means of an electromagnetic arrangement, the coherence of the outputted beam may be varied.

Figure 4:
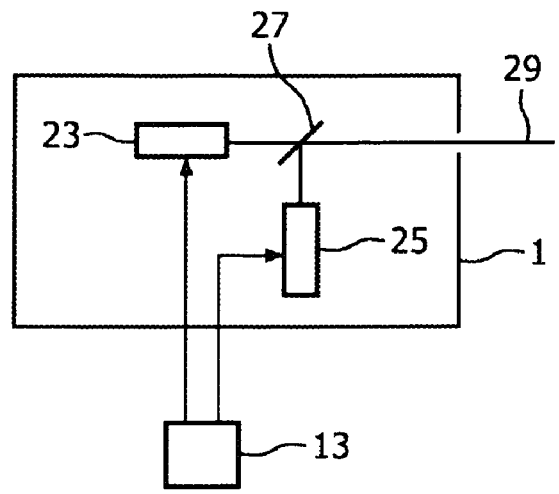
FIG. 4 illustrates a two-laser system.

FIG. 4 illustrates a two-laser system 1, where system comprises a first 23 and a second 25 laser. E.g. a semi-transparent mirror 27 may be used to make the outputted beams from the lasers coincide as a compound laser beam 29. This system may be switched between a high-coherence mode and a low coherence mode. In the high coherence mode, the first laser 23 continuously produces the outputted light, which means that a large amount of speckle will be produced. In the low-coherence mode the first and second lasers are arranged to be switched on and off in order to alternatingly produce the outputted light 29. The switching frequency may be e.g. 200 Hz. Since the first and second lasers are mutually incoherent, this dissolves the temporal coherence of the outputted compound beam. The amount of speckle will be lower.

Again with reference to FIG. 1, that lighting system 1 may be provided with a non-laser light source 31, e.g. a light emitting diode. The lighting system may then be switched between a high coherence mode and a low-coherence mode by complementary activating the laser 3 or the non-laser light source 31.

Figure 5:
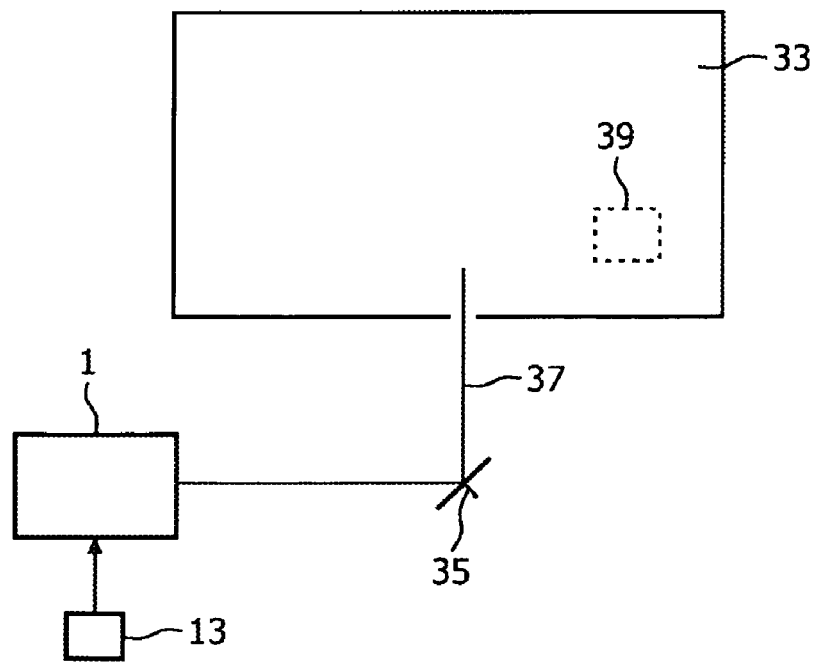
FIG. 5 shows a laser display system.

FIG. 5 illustrates schematically a laser display system. In this system the outputted light from the lighting system 1 is used to display information on a display surface 33. The laser display system comprises projection means 35, which is arranged to project a laser beam 37 along a predetermined path on the display surface 33, thus displaying information such as text thereon. Other projection means may be used to sweep the laser beam along lines on the surface and to modulate the light flow to display an image on the surface 33 similar to in a cathode ray tube (CRT). The light flow may then be modulated e.g. using a fast modulator, such as an acousto-optical modulator, in the projection means 35, or by means of direct amplitude modulation of the laser source.

The control means 13 is used to control the level of coherence in the laser beam 37 and thus the amount of speckle produced on the display surface 33. A varying speckle pattern may thus be produced.

This may affect the entire display surface 33 or a limited portion 39 thereof. The later effect may be accomplished by switching the speckle on at the periods of time when the laser beam 37 is lighting a spot within the limited portion 39. It is thus possible to draw a user's attention either to the display surface in general or to a certain part thereof, if it is desired to draw the user's attention in particular to information displayed on that part of the surface.

The lighting system may also be used in a general display device where the lighting system provides light with a variable coherence e.g. as backlight. In such cases the screen 7 in FIG. 1 may consist e.g. of an LCD panel.

In summary, the invention relates to a lighting system, having a laser, and a method carried out in such a system. The system is arranged to vary the coherence of outputted light, preferably periodically, such that the light, when projected onto a surface, produces a varying amount of speckle. This has proven useful as a tool to attract the attention of a user, viewing the light projected on the surface.

The invention is not restricted to the described embodiments. It can be altered in different ways within the scope of the appended claims.

The invention claimed is:

1. A lighting system for producing visible outputted light, the system being arranged to vary the coherence of the outputted light, such that the light, when projected onto a surface produces a varying amount of speckle thereby attracting the attention of a viewer, the system comprising a first and a second laser, wherein, in a high-coherence mode, said first laser continuously produces the outputted light, and, in a low-coherence mode the first and second lasers are arranged to be switched on and off in order to alternatingly produce the outputted light, wherein the lighting system is switched between high- and low-coherence modes.

2. A lighting system according to claim 1, wherein the coherence of the outputted light is varied periodically.

3. A lighting system according to claim 1, which is arranged as a lamp having a transparent screen.

4. A lighting system according to claim 1, wherein the lighting system is arranged as a display device, generating an image on a display surface.

5. A lighting system according to claim 4, wherein system is arranged in such a way that speckle pattern is generated on a limited area of the display surface.

6. A lighting system according to claim 1, wherein at least one of said first and second laser comprises controllable coherence reduction means.

7. A lighting system for producing visible outputted light, the system being arranged to vary the coherence of the outputted light, such that the light, when projected onto a surface produces a varying amount of speckle thereby attracting the attention of a viewer, the system comprising at least one laser source and a non-laser light source, wherein in a high-coherence mode, said at least one laser produces the outputted light, and, in a low-coherence mode the non-laser light source produces the outputted light, wherein the lighting system is switched between the high- and low-coherence modes.

8. A lighting system according to claim 7, wherein said at least one laser comprises controllable coherence reduction means.

9. A lighting system according to claim 8, wherein the laser comprises a VCSEL array comprising a plurality of light emitting sub-elements.

10. A lighting system according to claim 7, wherein said at least one laser produces a continuous high-coherence laser beam and the system further comprises a controllable coherence reducer, through which the laser beam propagates and which to a controllable extent removes the coherence of the propagating laser beam.

11. A lighting system according to claim 7, wherein the coherence of the outputted light is varied periodically.

12. A lighting system according to claim 7, arranged as a lamp having a transparent screen.

13. A lighting system according to claim 7, wherein the lighting system is arranged as a display device, generating an image on a display surface.

14. A lighting system according to claim 13, wherein system is arranged in such a way that speckle pattern is generated on a limited area of the display surface.

* * * * *